(12) United States Patent
Mirkin et al.

(10) Patent No.: US 7,223,438 B2
(45) Date of Patent: May 29, 2007

(54) PATTERNING MAGNETIC NANOSTRUCTURES

(75) Inventors: Chad A. Mirkin, Wilmette, IL (US); Lei Fu, Evanston, IL (US); Xiaogang Liu, Evanston, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 282 days.

(21) Appl. No.: 10/663,976

(22) Filed: Sep. 17, 2003

(65) Prior Publication Data

US 2004/0142106 A1 Jul. 22, 2004

Related U.S. Application Data

(60) Provisional application No. 60/410,952, filed on Sep. 17, 2002.

(51) Int. Cl.
*B05D 5/12* (2006.01)
(52) U.S. Cl. .......... 427/127; 427/11; 427/256; 427/258; 427/261; 427/265; 427/269; 427/287; 101/450.1; 101/483; 101/491; 250/306; 250/310; 250/311
(58) Field of Classification Search .......... 427/11, 427/256, 258, 261, 265, 269, 287, 127; 101/450.1, 101/482, 491; 250/306, 310, 311
See application file for complete search history.

(56) References Cited

U.S. PATENT DOCUMENTS

| | | | | |
|---|---|---|---|---|
| 4,668,299 A | * | 5/1987 | Nanao et al. | 106/419 |
| 5,246,609 A | * | 9/1993 | Nakata et al. | 252/62.59 |
| 6,270,946 B1 | * | 8/2001 | Miller | 430/296 |
| 6,573,369 B2 | * | 6/2003 | Henderson et al. | 536/23.1 |
| 6,635,311 B1 | | 10/2003 | Mirkin | |
| 6,827,979 B2 | | 12/2004 | Mirkin | |
| 2003/0162004 A1 | | 8/2003 | Mirkin | |
| 2005/0255237 A1 | * | 11/2005 | Zhang et al. | 427/180 |

OTHER PUBLICATIONS

Jaschke et al; Deposition of Organic Material by the tip of a scanning Force Microscope; Langmuir; 1995; 11; 1061-1064.*

Ming Su et al., "Moving beyond Molecules: Patterning Solid-State Features via Dip-Pen Nanolithography with Sol-Based Inks," J. Am. Chem. Soc., Jan. 31, 2002, vol. 124, No. 8, XP001176800, pp. 1560-1561.

Xiaogang Liu et al., "Arrays of Magnetic Nanoparticles Patterned via "Dip-Pen" Nanoliography," Advanced Materials, Feb. 5, 2002, vol. 14, No. 3, XP002266951, pp. 231-234.

(Continued)

*Primary Examiner*—Alain L. Bashore
(74) *Attorney, Agent, or Firm*—Foley & Lardner LLP (57) ABSTRACT

A direct-write method for fabricating magnetic nanostructures, including hard magnetic nanostructures of barium hexaferrite, BaFe, based on nanolithographic printing and a sol-gel process. This method utilizes a conventional atomic force microscope tip, coated with a magnetic material precursor solution, to generate patterns that can be post-treated at elevated temperature to generate magnetic features consisting of barium ferrite in its hexagonal magnetoplumbite (M-type) structure. Features ranging from several hundred nm down to below 100 nm were generated and studied using AFM, magnetic force microscopy, and X-ray photoelectron spectroscopy. The approach offers a new way for patterning functional inorganic magnetic nanostructures with deliberate control over feature size and shape, as well as interfeature distance and location.

75 Claims, 5 Drawing Sheets

OTHER PUBLICATIONS

International Search Report dated Sep. 17, 2003.

New, et al., "Submicron Patterning of Thin Cobalt Films for Magnetic Storage," Journal of Vacuum Science & Tecnology B, Nov./Dec. 1994, pp. 3196-3201, vol. 12, No. 6.

O'Grady, et al., "The Limits of Magnetic Recording—Media Considerations," Journal of Magnetism and Magnetic Materials 200, 1999, pp. 616-633.

Hylton, et al., "Preparation and Magnetic Properties of Epitaxial Barium Ferrite Thin Films on Sapphire with In-Plane, Uniaxial Anisotropy," Applied Physics Letters, Aug. 17, 1992, pp. 867-869, vol. 61, No. 7.

Piner, et al., "Dip-Pen" Nanolithography, Science, Jan. 29, 1999, pp. 661-663, vol. 283.

Maynor, et al., "Au "Ink" for AFM "Dip-Pen" Nanolithography," Langmuir, 2001, pp. 2575-2578, vol. 17, No. 9.

Li, et al., "Electrochemical AFM "Dip-Pen" Nanolithography," J. Am. Chem. Soc., 2001, pp. 2105-2106, vol. 123.

Noy, et al., "Fabrication of Luminescent Nanostructures and Polymer Nanowires Using Dip-Pen Nanolithgraphy," Nano Letters, 2002, pp. 109-112, vol. 2, No. 2.

Liu, et al., "Arrays of Magnetic Nanoparticles Patterned via "Dip-Pen" Nanolithography," Advanced Materials, Feb. 5, 2002, vol. 14, No. 3.

McKendry, et al., "Creating Nanoscale Patterns of Dendrimers on Silicon Surfaces with Dip-Pen Nanolithography," Nano Letters, 2002, pp. 713-716, vol. 2, No. 7.

Porter, et al., Electroless Nanoparticle Film Deposition Compatible with Photolithography, Microcontact Printing, and Dip-Pen Nanolithography Patterning Technologies, Nano Letters, 2002, pp. 1369-1372, vol. 2, No. 12.

Agarwal, et al., "Dip-Pen Nanolithography in Tapping Mode," J. Am. Chem. Soc., 2003, pp. 580-583, vol. 125.

Yang, et al., "Hierarchically Ordered Oxides," Science, Dec. 18, 1998, pp. 2244-2246, vol. 282.

Zhong, et al., "Key Step in Synthesis of Ultrafine $BaFe_{12}O_{19}$ by Sol-Gel Technique," Journal of Magnetism and Magnetic Materials, 1997, pp. 196-202, vol. 168.

Briggs, et al., "Ion and Neutral Spectroscopy," Practical Surface Analysis, Second Edition.

Duval, et al., "Evidence of the Existence of Three Types of Species at the Quatrz-Aqueous Solution Interface at pH 0-10: XPS Surface Group Quantification and Surface Complexation Modeling," J. Phys. Chem. B, 2002, pp. 2937-2945, vol. 106.

Zhang, et al., "A MEMS Nanoplotter with High-Density Parallel Dip-Pen Nanolithography Probe Arrays," Nanotechnology, Apr. 2002, pp. 212-217, vol. 13, No. 2.

Chou, et al., "Nanolithographically Defined Magnetic Structures and Quantum Magnetic Disk (Invited)," J. Appl. Phys., Apr. 15, 1996, vol. 79, No. 8.

Ishikawa, et al., "Magnetic and Structural Properties of Ba-ferrite Films Prepared by Sol-Gel Processing," J. Appl. Phys., May 1, 1996, pp. 7080-7083, vol. 79, No. 9.

Awschalom, D. D., et al., "Electron spin and optical coherence in semiconductors," Phys. Today, vol. 52, pp. 33-38 (1999).

Baselt, D. R., et al., "A biosensor based on magnetoresistance technology," Biosenns Bioelectron, vol. 13, pp. 731-739 (1998).

Chemla, Y. R., et al., "Ultrasensitive magnetic biosensor for homogeneous immunoassay," Proc. Natl. Acad. Sci., USA, vol. 97, pp. 1468-14272 (2000).

Demers, L. M., et al., "Combinatorial Templates Generated by Dip-Pen Nanolithography for the Formation of Two-Dimensional Particle Arrays", Agnew Chem. Int. Ed., Engl., vol. 40, No. 16, pp. 3069-3071 (2001).

Demers, L. M., et al., "Orthogonal Assembly of Nanoparticle Building Blocks on Dip-Pen Nanolithographically Generated Templates of DNA", Agnew Chem. Int. Ed., Engl., vol. 40, No. 16, pp. 3071-3073 (2001).

Demers, L. M., et al., "Direct patterning of modified oligonucleotides on metals and insulators by dip-pen nanolithography", Science, vol. 296, pp. 1836-1838 (2002).

Fan et al., "Rapid Prototyping of patterned functional nanostructures", Nature, vol. 405, pp. 56-60 (2000).

Hong, et al., "Multiple Ink Nanolithography Toward a Multiple-Pen Nano-Plotter", Science, vol. 286, pp. 523-525 (1999).

Hong, et al., "A New Tool for Studying the in Situ Growth Process for Self-Assembled Monolayers under Ambient Conditions", Langmuir, vol. 15, pp. 7897-1900 (1999).

Hong, et al., "A Nanoplotter with Both Parallel and Serial Writing Capabilities", Science, vol. 288, pp. 1808-1811 (2000).

Ichinose, et al., "A Surface Sol-Gel Process of $TiO_2$ and Other Metal Oxide Films with Molecular Precision", Chem. Mater., vol. 9, No. 6, pp. 1296-1298 (1997).

Ivanisevic, et al., "'Dip-Pen' Nanolithography on Semiconductor Surfaces", J. Am. Chem. Soc., vol. 123, pp. 7887-7889 (2001).

Kong, et al., "Synthesis of individual single-walled crbon nanotubes on patterned silicon wafers", Nature, vol. 395, pp. 878-881 (1998).

Lu et al., "Self-assembly of mesoscopically ordered chromatic polydiacetylene/silica nanocomposites", Nature, vol. 410, pp. 913-917 (2001).

Ohno, H., et al., "Electric-field control of ferromagnetism", Nature, vol. 408, pp. 944-946 (2000).

Prinz, G. A., "Magnetoelectronics", Science, vol. 282, pp. 1660-1663 (1998).

Sorensen, C. M., "Magnetism", Nanoscale Materials in Chemistry (Wiley, New York, 2001), including Chptr. 6.

White, R. L., et al., "Patterned media : a viable route to 50 $Gbit/in^2$ and up for magnetic recording", IEEE Trans. Mag., vol. 33, pp. 990-995 (1997).

Yang, et al., "Mirrorless Lasing from Mesostructured Waveguides Patterned by Soft Lithography", Science, vol. 287, pp. 465-467 (2000).

Sun, et al., "Monodisperse FePt Nanoparticles and Ferromagnetic FePt Nanocrystal Superlattices," Science, Mar. 17, 2000, pp. 1989-1992, vol. 287.

Edelstein, et al., "The BARC Biosensor Applied to the Detection of Biological Warfare Agents," Biosensors & Bioelectronics, 2000, pp. 805-813, vol. 14.

Xia, et al., "Unconventional Methods for Fabricating and Patterning Nanostructures," Chemical Review, 1999, pp. 1823-1848, vol. 99.

Freeman, et al., "Advances In Magnetic Microscopy," Science, Nov. 16, 2001, pp. 1484-1488, vol. 294.

\* cited by examiner

Figure 1a

Water meniscus — DPN patterning with a "sol"

Figure 1b

BaFe precursor molecules

Figure 1c

BaFe particles

1) Preheated at 450°C for 4h
2) Annealed at 950°C for 2h

AFM image of DPN patterning of Manganese Ferrite Nanostructures

Figure 4

PATTERNING MAGNETIC NANOSTRUCTURES

RELATED APPLICATIONS

This application claims benefit to provisional application 60/410,952 filed Sep. 17, 2002 to Mirkin et al, the complete disclosure of which is hereby incorporated by reference in its entirety.

STATEMENT OF FEDERAL GOVERNMENT RESEARCH SUPPORT

The subject matter of this application was developed in part with federal government funds from grant no. AFOSR F49620-00-1-0283/P01, DARPA DAAD 19-00-1-0414, and NSF EEC-0118025. The federal government may have certain rights in the invention.

BACKGROUND

Magnetic materials are commercially important, and a commercial need exists to develop smaller magnetic structures, approaching single domain sizes. Processing of magnetic materials, however, can be a challenge, particularly at smaller scales. For example, high temperature may be needed for fabrication which could prevent some applications or increase production cost. Hence, a commercial need exists to find better methods to fabricate smaller magnetic structures. In addition, a commercial need exists to better understand how magnetic behavior is a function of structure size. For example, the coercivity of small particles can depend on particle size. At smaller sizes, moreover, interfacial surface effects generally become more significant. Layering of magnetic structures can be significant, including the GMR effect (giant magnetoresistance effect). Many applications are important for small magnetic structures including high-density recording media, nonvolatile memories, microwave circuits, biosensors, bioelectronics, communication devices, and magnetic microscopy.

Types of magnets include soft magnets and hard magnets. In particular, hard magnets are of commercial interest which generally have high permanent magnetization, high coercivity (e.g., $H_c$ greater than or equal to about 10 Oe), and high mechanical and chemical stability. Generally, hard magnets, which are a type of permanent magnet, display a relatively squarish magnetization v. field (M-H) loop, coupled with physical and chemical stability. For example, they can be useful permanent magnets which are difficult to demagnetize by unexpected fields. One important example of a hard magnet is barium hexaferrite (BaFe). Like many magnetic materials, however, BaFe, can be difficult to pattern at higher resolution. Thin film preparation can be carried out using rf sputtering, or reactive magnetron sputtering, followed by annealing at high temperature. Some of the resultant thin film can be nonmagnetic. In addition, a need exists to reduce the grain size.

Small magnetic structures, in principle at least, can be patterned by electron beam lithography, but this method requires expensive instrumentation and is not very versatile. For example, the electron beam can introduce chemical changes to the materials upon exposure and requires a high vacuum.

Improved methods are needed to pattern small magnetic structures including nanostructures. The methods should be convenient, versatile, and provide high resolution and alignment. Methods should be applicable to magnetic materials which are difficult to process.

SUMMARY

The present invention provides multiple embodiments, and this summary of these multiple embodiments should not be used to limit the scope of the invention.

For example, in one embodiment, the present invention provides a method of forming a magnetic nanostructure comprising: depositing a magnetic nanostructure precursor on a substrate from a nanoscopic tip; and converting the precursor to form the magnetic nanostructure on the substrate.

For example, in another embodiment, the present invention provides a method of forming a hard magnet nanostructure comprising: depositing a hard magnet nanostructure precursor on a substrate from a tip; and converting the precursor to form the hard magnet nanostructure on the substrate.

The present invention also provides a method of forming a soft magnet nanostructure comprising: depositing a soft magnet nanostructure precursor on a substrate from a tip; and converting the precursor to form the soft magnet nanostructure on the substrate.

The present invention also provides a method of forming a sol gel magnetic nanostructure comprising: depositing a sol gel magnetic nanostructure precursor on a substrate from a tip; and converting the precursor to form the sol-gel magnetic nanostructure on the substrate.

The present invention also provides a method of forming an array of magnetic nanostructures comprising: depositing one or more magnetic nanostructure sol-gel precursor on a substrate to form a plurality of nanostructures of precursors; and converting the nanostructures to form the array of magnetic nanostructures.

The present invention also provides a method of forming a ferromagnetic nanostructure comprising: depositing a ferromagnetic nanostructure precursor on a substrate; and converting the precursor to form the ferromagnetic nanostructure on the substrate, wherein the precursor comprises a solvent based patterning ink consisting essentially of magnetic precursor and solvent in sol state.

The present invention also provides a method of nanolithography comprising: providing a substrate, providing a nanoscopic tip having an inking composition thereon, wherein the inking composition comprises at least one magnetic material precursor; transferring the inking composition from the nanoscopic tip to the substrate to form a deposit on the substrate comprising at least one magnetic material precursor.

The present invention also provides a method of nanolithography comprising: positioning a scanning probe microscopic tip having a magnetic reactive ink composition thereon relative to a substrate so that the reactive ink composition is transferred from the nanoscopic tip to the substrate to form a deposit on the substrate, wherein the reactive ink is a sol-gel precursor capable of undergoing a sol-gel reaction.

The present invention also provides a magnetic nanostructure comprising a substrate and one or more magnetic nanostructures disposed thereon, wherein the nanostructure has a lateral area of about 100,000 $nm^2$ or less.

The present invention also provides an array of individual magnetic nanostructures comprising: a substrate and individual magnetic nanostructures disposed thereon, wherein the nanostructure has a lateral area of about 100,000 nm$^2$ or less.

The present invention also includes articles made from these methods and uses of the methods. Basic and novel features of the invention include use of relatively inexpensive instrumentation, good alignment and resolution, and versatility in compositions which can be deposited under controlled conditions, and ability to deposit and image with the same instrument. Ink compositions can be formulated to exclude components which interference with the deposition process, be they solvent or large magnetic particles.

BRIEF DESCRIPTION OF THE DRAWINGS

FIGS. 1(a)–(c) provide a schematic diagram depicting the patterning of magnetic BaFe nanostructures on silicon oxide.

FIGS. 2(a)–(f) provide characterization of the bulk BaFe particle samples.

FIGS. 3(a)–(f) provide scanning probe microscope (SPM) studies of the BaFe pattern and x-ray photoelectron spectroscopy (XPS) characterization.

DETAILED DESCRIPTION

The complete disclosure of priority provisional application 60/410,952 filed Sep. 17, 2002 to Mirkin et al, is hereby incorporated by reference in its entirety including the figures, description, and claims.

In addition, the complete disclosure, including the figures, of the following paper to Fu et al. is incorporated by reference: "Nanopatterning of 'Hard' Magnetic Nanostructures via Dip-Pen Nanolithography and a Sol-Based Ink," *NanoLetters*, 2003, Vol. 3, No. 6 757–760.

One skilled in the art can refer to the technical literature in practicing the present invention including literature on magnetic materials, sol-gel processing, and nanolithographic printing including DPN printing. In particular, one skilled in the art can refer to the technical literature for assistance in the practice of the claimed invention, which relates to magnetic materials, and in particular, magnetic materials comprising metals and metal oxides. For example, magnetic materials in information storage technology are described in P. Ball, *Made to Measure: New Materials for the 21$^{st}$ Century,* Princeton, Chapter 2, pages 63–102, 1997; and C. P. Poole and F. J. Owens, *Introduction to Nanotechnology*, Chapter 7, "Nanostructured Ferromagnetism," pages 165–193, 2003, Wiley. See, also, J. Shackelford, *Introduction to Materials Science for Engineers*, 4$^{th}$ ed., Prentice Hall, 1996, in particular chapter 13, pages 502–530. Recently, there has been considerable interest in methods for synthesizing and patterning magnetic small scale, microscale, and nanoscale materials and related ceramic and conductive materials. In addition to exhibiting novel size-dependent properties (see documents 1–10, for example), these materials (particularly ones with high coercivities and mechanical stabilities, e.g., semi-hard and hard magnets) are being explored as potential avenues to high-density recording media (see documents 11–14, for example). All of the references described in this paragraph are incorporated herein by reference.

In the present invention, patterns of magnetic materials can be formed by lithography and related deposition fabrication methods providing small structures including nanostructures at high resolution. The magnetic material formed by patterning, and if necessary subsequent post-patterning treatment, is not particularly limited. In general, the sol-gel process route to magnetic material formation can be used, and magnetic materials which are compatible with the sol-gel route can be used. Commercially important metallic magnets for the present invention can be ferromagnetic. Further, these materials can be generally categorized as either soft, semi-hard, or hard magnets. In general, the compositional and structural factors that lead to magnetic hardness are generally the same ones that produce mechanical hardness, as described in, for example, J. F. Shackelford, *Introduction to Materials Science for Engineers*, 4$^{th}$ Ed., 1996, including chapters 7 and 13. In addition, another type of magnetic material includes ceramic magnets.

Hard magnets can be used in permanent magnet applications. Examples of hard magnet alloys include samarium-cobalt, platinum-cobalt, and Alnico. The hard magnet of the present invention, however, is not particularly limited. Ba/Sr hexaferrites can be used. Barium hexa-ferrite (for purposes of this disclosure, "BaFe,"; ideal chemical formula representation is BaFe$_{12}$O$_{19}$), in particular, is a good hard magnet candidate for such media, but it is challenging to achieve high resolution patterning of BaFe by conventional lithography and etching processes (see documents 15, 16, for example). BaFe is a permanent magnet with large magnetic anisotropy. The BaFe compositions of the present invention can further comprise impurities and can be used as mixtures, although in general it is preferred that the BaFe composition is at least 50% by weight pure BaFe, and more preferably, at least 80% by weight pure BaFe. For example, strontium and calcium ferrites can be impurities in barrium ferrite.

Besides BaFe and analogs thereof such as for example SrFe$_{12}$O$_{19}$, other examples of hard magnets include hexagonal ferrites, as well as compounds/alloys including, for example, SmCo$_5$, Sm$_2$Co$_{17}$, Nd$_2$Fe$_{14}$B, and other ferromagnetic oxides and ferromagnetic compounds/alloys.

Barium ferrite and related compositions, including their preparation methods, are known in the art as in, for example, U.S. Pat. Nos. 4,042,516; 4,277,552; 4,407,721; and 4,582,623.

Preferred embodiments of the present invention comprise hard magnetic materials, and magnetic materials which can be fabricated and generally processed by sol-gel methods, and can be generally fabricated into small patterns with use of nanolithography and printing inks.

Herein, a novel direct-write nanopatterning method for a variety of magnetic materials, including hard magnets and BaFe, is disclosed, based upon DIP PEN NANOLITHOGRAPHY™ printing (DPN™ printing) and also based on a sol-gel process. DIP PEN NANOLITHOGRAPHY™ and DPN™ are trademarks of NanoInk, Chicago, Ill. and are used accordingly herein. Instrumentation and equipment related to this nanolithographic method can be obtained from NanoInk. Generally, although nanolithography and nanostructures are preferred in the present invention, microlithography and microstructures can be also carried out by the DPN printing method. Applications for nanolithography and magnetic materials are described in, for example, U.S. Pat. No. 5,461,600 (Pohl, Oct. 24, 1995); U.S. Pat. No. 5,772,405 (Chou, Jun. 30, 1998); and U.S. Pat. No. 6,519,221 (Manalis, Feb. 11, 2003).

Nanolithography, including DPN printing, can be used to practice the present invention, particularly methods involving deposition or transfer of materials from a tip such as a nanoscopic tip to a substrate. For example, in patent application Ser. No. 09/866,533, filed May 24, 2001, (U.S. patent publication no. US 2002/0063212 A1 published May 30, 2002 to Mirkin et al.) DPN printing background and procedures are described in detail covering a wide variety of embodiments including, for example:

background (pages 1–3);
summary (pages 3–4);
brief description of drawings (pages 4–10);
use of scanning probe microscope tips (pages 10–12);
substrates (pages 12–13) including magnetic substrates;
patterning compounds (pages 13–17);
practicing methods including, for example, coating tips (pages 18–20);
instrumentation including nanoplotters (pages 20–24);
use of multiple layers and related printing and lithographic methods (pages 24–26);
resolution (pages 26–27);
arrays and combinatorial arrays (pages 27–30);
software and calibration (pages 30–35; 68–70);
kits and other articles including tips coated with hydrophobic compounds (pages 35–37);
working examples (pages 38–67);
corresponding claims and abstract (pages 71–82); and
FIGS. 1–28.

All of the above document text, including each of the various subsections enumerated above including the figures, is hereby incorporated by reference in its entirety and form part of the present disclosure, supporting the claims.

In combination with direct write printing, sol-gel chemistry can be used to practice the present invention, and one skilled in the art can refer to the literature regarding sol-gel processing, particularly as it relates to magnetic applications: U.S. Pat. No. 5,545,432, for example, to DeGuire et al. (Aug. 13, 1996) describes sol gel process of metal oxide films including magnetic material films. For example, microstructures, nanostructures, microarrays, and nanoarrays can be prepared using the technologies of sol-gel chemistry and DPN printing in combination. For the present invention, the sol-gel process generally refers to a low temperature method using chemical precursors that can produce solid state structures such as magnetic materials, ceramics and glasses with better purity and homogeneity than high temperature conventional processes. This process can be used to produce a wide range of compositions (for example metal oxides) in various forms, including compositions useful for powders, fibers, coatings/thin films, monoliths, composites, and porous membranes. In the present invention, organic/inorganic hybrids, where an inorganic gel is impregnated with organic components such as polymers or organic dyes to provide specific properties, can also be made. An attractive feature of the sol-gel process is the capability to produce compositions not possible with conventional methods. Another benefit is that the mixing level of the solution is retained in the final product, often on the molecular scale. For example, nanocomposites can be made. Applications for sol-gel derived products, including those of the present invention, are numerous and include the magnetic applications described herein. Applications include coatings and thin films used in electronic, optical and electro-optical components and devices, including optical absorption or index-graded antireflective coatings. Other example devices include capacitors, memory devices, substrates and infrared (IR) detectors. Additional devices include thin film transistors, field effect transistors, bipolar junction transistors, hybrid transistors, charge transfer devices, field emission devices, integrated circuits, solar cells, light emitting diodes, flat panel displays, optical waveguides, and waveguide division multiplexers. Antireflection coatings are also used for automotive and architectural applications. Magnetic materials can be also used in life sciences, pharmaceuticals, diagnostics, and sensors. U.S. Pat. No. 6,326,087 describes sol-gel processing to form metal oxide films for magnetic applications, and is incorporated herein by reference.

For purposes of the present invention, the sol-gel process can be carried out in liquid solution of organometallic precursors, which, by means of hydrolysis and condensation reactions, lead to the formation of a new phase (sol).

$$M\text{-}O\text{-}R + H_2O \rightarrow M\text{-}OH + R\text{-}OH \text{ (hydrolysis)}$$

$$M\text{-}OH + HO\text{-}M \rightarrow M\text{-}O\text{-}M + H_2O \text{ (water condensation)}$$

$$M\text{-}O\text{-}R + HO\text{-}M \rightarrow M\text{-}O\text{-}M + R\text{-}OH \text{ (alcohol condensation)}$$

The sol can be made of solid particles suspended in a liquid phase. Then the particles can condense in a new phase (gel) in which a solid macromolecule is immersed in a liquid phase (solvent). This is a gelatinous network. Drying the gel by means of low temperature treatments (typically, for example, about 25° C. to about 400° C., and more typically about 25° C. to about 100° C.), results in porous solid matrices (xerogels) which if desired can be calcined into a dense ceramic. With use of rapid drying, aerogels can be made. An important property of the sol-gel process is that it is possible to generate glass or ceramic material at a temperature close to room temperature.

Direct write nanolithographic printing using sol-gel compositions, including DPN printing, is described in U.S. regular patent application filed Dec. 17, 2002, Ser. No. 10/320,721, to Mirkin et al., "Patterning of Solid State Features by Direct Write Nanolithographic Printing," which is hereby incorporated by reference in its entirety (now patent publication 2003/0162004 published Aug. 28, 2003).

Patterning of magnetic nanoparticles, and use of magnetic driving forces in patterning, is described in, for example, US Patent Publication 2002/0122873 published Sep. 5, 2003 to Mirkin et al., which is hereby incorporated by reference in its entirety. In a preferred embodiment of this invention, however, magnetic driving forces are not used. Rather, deposition is carried out when the magnetic materials is in a precursor, non-magnetic form. If desired, the magnetic precursor can be chemically linked to the substrate surface, or the substrate can be treated to improve physical binding between ink and substrate.

In the present invention, a variety of methods can be used to form the magnet materials nanostructure. For example, the method can comprise depositing a magnetic material nanostructure precursor on a substrate; and converting the precursor to form the magnetic nanostructure on the substrate. The depositing step can be carried out with use of a solid tip having the magnetic nanostructure precursor at the end of the tip. For example, the depositing step can be carried out with use of a nanoscopic tip or with use of a scanning probe microscope tip. Tips which can function as atomic force microscopic tips (AFM tips) are particularly preferred. In addition, the depositing step can be carried out with use of a hollow tip, wherein the patterning ink is transported through the hollow aspect of the tip. Also, the depositing step can be carried out with use of a sol-gel precursor.

The experimental parameters for nanolithographic printing can be adapted for use in the patterning of magnetic structures including precursors of these structures. During direct write nanolithographic printing, including DPN printing, for example, the contact force can be, for example, between approximately 0.5 nN and approximately 5 nN, more preferably between approximately 1.0 nN and approximately 4 nN, and even more preferably approximately 1.5 and approximately 3.5 nN. In addition, preferably, the humidity is between approximately 20% and approximately 50%, more preferably between approximately 30% and approximately 40%.

The ink composition can be formulated to achieve commercially needed, superior resolution and high quality in the patterned nanostructures. For example, a solvent system can be selected which provides for superior resolution in view of the selected pre-cursor reagents. Basic and novel features of the present invention include that the ink composition is tailored for magnetic printing and does not include components and amounts of components which interfere with this application. The patterning ink composition can consist essentially of components which facilitate magnetic printing applications. For example, solvent selection can be carefully controlled and solvents which do not provide the desired performance at certain concentrations can be excluded. Particulate matter can be excluded, particularly micron scale and larger scale particulate matter in the ink.

Once the magnetic precursor is patterned, the precursor can be converted to a magnetic structure by, for example, heating including both initial pre-heating processes and later stage annealing processes. Preferably, preheating is performed in a temperature range between approximately 350° C. and approximately 600° C., more preferably between approximately 400° C. and approximately 550° C. Preferably, preheating is performed in a time range between approximately 1 hour and approximately 6 hours, more preferably between approximately 2 hours and approximately 5 hours. Preferably, annealing is performed in a temperature range between approximately 600° C. and approximately 1200° C., more preferably between approximately 700° C. and approximately 1100° C., most preferably between approximately 800° C. and approximately 1000° C. Preferably, annealing is performed in a time range between approximately 0.5 hour and approximately 6 hours, more preferably between approximately 1 hour and approximately 5 hours, most preferably between approximately 2 hours and approximately 4 hours.

The nanostructures of interest are generally lateral structures placed on a surface having a height and lateral dimensions other than height such as length and width, particularly if placed in a regular form such as a line or a dot can have a line width or dot diameter. The nanostructure can have a size dimension other than height of about one micron or less. Size dimensions other than height include, for example, lateral measurements such as dot diameters and line widths. Preferably the patterned nanostructure has dimensions between approximately 10 nm to 1000 nm, more preferably between approximately 20 nm to 500 nm, and most preferably between approximately 50 nm to 100 nm. Nanostructures having a size dimension other than height of less than about 100 nm or less, and even less than about 10 nm or less, are of particular interest.

In addition, individual nanostructures can be characterized by their lateral area in square run. For example, an individual magnetic bar having a length of 100 nm and a width of 100 nm would have a lateral area of 10,000 $nm^2$. Individual nanostructures can have, for example, a lateral area of about 100,000 $nm^2$ or less, more particularly, about 10,000 $nm^2$ or less, more particularly, about 1,000 $nm^2$ or less, or more particularly about 100 $nm^2$ or less.

The height of the nanostructures is not particularly limited and layered structures can be formed. For example, nanostructures having height of about 50 nm or less can be prepared, as well as nanostructures having height less than about 10 nm. Heights of about 5 nm to about 25 nm can be useful. When layered structures are formed, the compositions of the individual layers can be the same or varied.

In general, nanostructures having few individual domains can be made. For example, the number of domains in a nanostructure can be 10 or less, or 5 or less, three, or two.

Arrays of magnetic nanostructures can be prepared in which individual nanostructures can be separated from each other by distances less than about one micron, or more particularly, less than about 500 nm, or more particularly, less than about 100 nm. Another method to characterize separation distance is to measure the distance between the center point of the nanostructure such as the center point of a dot or a center line of a line. The distances between the centers can be, for example, about one micron or less, or more particularly, about 500 nm or less, or more particularly about 100 nm or less. High density patterning can be carried out wherein, for example, a plurality of nanostructures are patterned, optionally in a regular array, and each nanostructure has a small size itself and a small separation distance from an adjacent nanostructure. For example, pattern densities can be one nanostructure per $5 \times 10^6$ $mm^2$ of substrate area of patterned array or less, or more particularly, one nanostructure per $5 \times 10^4$ $nm^2$ of substrate area of patterned array, or less, or more particularly, one nanostructure per $5 \times 10^2$ $nm^2$ substrate area of patterned array or less.

The nanostructures can be disposed on a substrate and can be disposed in a mechanically and chemically stable manner. For example, the nanostructures can be sufficiently stable on the substrate to resist solvent washing. If desired, the inks can be formulated and the substrates selected to provide chemical affinity, be it covalent bonding or chemisorption, to the substrate.

The small magnetic structures can be used in a variety of applications including, for example, high-density recording media, nonvolatile memories, microwave circuits, biosensors, bioelectronics, magnetic microscopy, cell phones, security alarms, and communication devices generally. Magnetic materials can be combined with non-magnetic materials whether in the same deposition structure or separate structures.

Many types of magnetic materials can be used in the present invention, particularly those magnetic materials that can be fabricated using the sol-gel method. Although hard magnetic materials and semi-hard magnetic materials are preferred embodiments of the invention, in another embodiment of this invention, the pattern of magnetic material can comprise soft ferrites, which can be represented by $MeFe_2O_4$, wherein Me represents a divalent transition metal atom such as, for example, Mn, Zn, Ni, Co, Cu, Fe, and Mg. In particular, Mn—Zn and Ni—Zn ferrite systems can be used. In particular, compositions comprising Mn can be formulated, and manganese ferrite nanostructures and arrays can be made. For example, arrays can be made comprising dots and lines. For dot arrays, the distance from the center of the dots can be, for example, about 50 nm to about 1,000 nm, or more particularly, about 200 nm to about 600 nm. The dot size in diameter can be, for example, about 20 nm diameter to about 1,000 nm, or more particularly, about 50 nm to about 500 nm, and more particularly, about 100 nm to about 250 nm. Line widths can have equal values as dot size diameter, and lines can be as long as desired including over one micron and about one to about 1,000 microns. In general, similar ink compositions can be used for soft and hard magnets except for the selection of metal. Hence, an advantage for this invention is the versatility of the ink system. Soft ferrites can be made by known routes including sintering of mixtures of components comprising the metals.

Semi-hard magnetic materials are described in, for example, U.S. Pat. No. 3,989,556 to Iwata et al. and U.S. Pat. No. 4,695,333 to Inoue et al. Generally, semi-hard magnetic materials are associated in applications more with hard magnetic materials than with soft magnetic materials. Semi-hard magnetic materials which can be prepared by the sol-gel route are particularly preferred for the present invention.

Inks formulated for preparation of soft ferrites can be formulated from the precursors including metal nitrates or metal acetates and ferric nitrate in appropriate stoichiometric proportions. The solvents can be, for example, ethylene glycol, 2-methoxyethoxyethanol, ethanol, or combinations thereof. When sol gel methods are used, the sol ink can be patterned directly onto surfaces, followed by thermal treatment to cover the sol into the solid phase. Soft magnets can be used in power applications including, for example, transformer cores.

Ceramic magnets can be used including low-conductivity ceramic magnets and superconducting ceramic magnets. Commercial ferrite compositions include metallic ferrites such as, for example, magnesium ferrite, magnesium-zinc ferrite, manganese ferrite, manganese-iron ferrite, nickel ferrite, and lithium ferrite.

In addition, ferrimagnetic materials can be also used. Also, garnets can be used including yttrium iron garnet (YIG), aluminum substituted YIG, chromium substituted YIG, lanthanum iron garnet, and praseodymium iron garnet.

Mixtures of different types magnetic precursors and magnets can be formulated as inks and patterned and converted to final form. In addition, different types of magnetic materials can be patterned and otherwise constructed to form a functional device.

Finally, the invention provides a number of preferred embodiments which are summarized by number:

For example, embodiment 1 is a method of forming a BaFe nanostructure comprising: depositing a BaFe precursor on a substrate via dip pen nanolithographic printing; and heating the precursor to form the BaFe nanostructure on the substrate. Embodiment 2 is the method of embodiment 1, wherein the substrate comprises Si. Embodiment 3 is the method of embodiment 2, wherein the surface of the substrate comprises $SiO_2$. Embodiment 4 is the method of embodiment 1, wherein the step of depositing is performed with a contact force between approximately 0.5 and approximately 5.0 nN. Embodiment 5 is the embodiment of claim 4, wherein the step of depositing is performed with a contact force between approximately 1.0 and approximately 4.0 nN. Embodiment 6 is the method of embodiment 5, wherein the step of depositing is performed with a contact force between approximately 1.5 and approximately 3.5 nN. Embodiment 7 is the method of embodiment 1, wherein the BaFe precursor comprises iron nitrate. Embodiment 8 is the method of embodiment 1, wherein the BaFe precursor comprises barium carbonate. Embodiment 9 is the method of embodiment 1, wherein the BaFe precursor comprises at least one alkylene glycol. Embodiment 10 is the method of embodiment 1, wherein the BaFe precursor comprises ethylene glycol. Embodiment 11 is the method of embodiment 1, wherein the BaFe precursor comprises a solvent which wets the substrate. Embodiment 12 is the method of embodiment 1, wherein the heating step comprises a step of preheating. Embodiment 13 is the method of embodiment 12, wherein the step of preheating is preformed in a temperature range between approximately 350° C. and approximately 600° C. Embodiment 14 is the method of embodiment 13, wherein the step of preheating is performed in a temperature range between approximately 400° C. and approximately 550° C. Embodiment 15 is the method of embodiment 12, wherein the step of preheating is performed for approximately 1 to 6 approximately hours. Embodiment 16 is the method of embodiment 15, wherein the step of preheating is performed for approximately 2 to approximately 5 hours. Embodiment 17 is the method of embodiment 1, wherein the heating step comprises a step of annealing performed in a temperature range between approximately 600° C. and approximately 1200° C. Embodiment 18 is the method of embodiment 17, wherein the step of annealing is performed in a temperature range between approximately 700° C. and approximately 1100° C. Embodiment 19 is the method of embodiment 18, wherein the step of annealing is performed in a temperature range between approximately 800° C. and 1000° C. Embodiment 20 is the method of embodiment 17, wherein the step of annealing is preformed for approximately 0.5 to approximately 6 hours. Embodiment 21 is the method of embodiment 20, wherein the step of annealing is preformed for approximately 1 to approximately 5 hours. Embodiment 22 is the method of embodiment 21, wherein the step of annealing is preformed for approximately 2 to approximately 4 hours. Embodiment 23 is the method of embodiment 1, wherein the nanostructure is magnetic. Embodiment 24 is the method of embodiment 1, further comprising the step of sonicating the precursor solution before deposition. Embodiment 25 is the method of embodiment 1, wherein the step of depositing comprises a step of dipping an AFM tip into a precursor solution. Embodiment 26 is the method of embodiment 1, wherein the nanostructures range from approximately 10 nm to approximately 1000 nm. Embodiment 27 is the method of embodiment 26, wherein the nanostructures range from approximately 20 nm to approximately 500 nm. Embodiment 28 is the method of embodiment 27, wherein the nanostructures range from approximately 50 nm to approximately 100 nm. Embodiment 29 is the method of embodiment 1, wherein the nanostructures are in the form of lines having line width of about 10 nm to about 1000 nm. Embodiment 30 is the method of embodiment 1, wherein the nanostructures are in the form of lines having line width of about 20 nm to about 500 nm. Embodiment 31 is the method of embodiment 1, wherein the nanostructures are in the form of lines having line width of about 50 nm to about 100 nm. Embodiment 32 is an array comprising nanostructured BaFe. Embodiment 33 is an array comprising nanostructured BaFe prepared by dip pen nanolithographic printing. Embodiment 34 is an array comprising dots of nanostructured BaFe prepared by dip pen nanolithographic printing and having a mean diameter of about 35 nm. Embodiment 35 is an array comprising lines of nanostructured BaFe prepared by dip pen nanolithographic printing and having line widths of about 10 nm to about 1,000 nm. Embodiment 36 is an array prepared by the method of embodiment 1. Embodiment 37 is an array comprising bars of BaFe prepared by dip pen nanolithographic printing, wherein the bars have an average area of about 215×465 nm$^2$ and an average height of about 7 nm. Embodiment 38 is an array comprising bars of BaFe prepared by dip pen nanolithographic printing, wherein the bars have an average average height of about 5 nm to about 25 nm. Embodiment 39 is an array comprising bars of BaFe prepared by dip pen nanolithographic printing, wherein the bars have an average average height of less than about 15 nm. Embodiment 40 is a method of forming a BaFe nanostructure consisting essentially of: depositing a BaFe precursor on a substrate via dip pen nanolithographic printing; and heating the precursor to form the BaFe nanostructure on the substrate. Embodiment 41 is an information storage system comprising BaFe nanostructures manufactured by the process of embodiment 1. Embodiment 42 is an information storage system of embodiment 41, wherein the information density is greater than approximately 60 Gb/in$^2$. Embodiment 43 is a method of embodiment 1, wherein the step of depositing is performed with a humidity between approximately 20% and approximately 50%. Embodiment 44 is the method of embodiment 43, wherein the humidity is between approximately 30% and approximately 40%.

The present invention is not limited by the specific embodiments expressly disclosed herein.

WORKING EXAMPLES

The invention is further described by means of the following nonlimiting working examples.

Figure 1A:
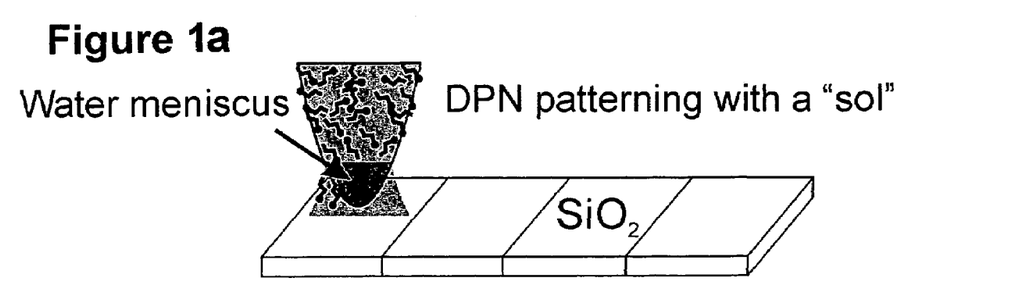
FIG. 1(a) shows an atomic force microscope (AFM) tip coated with a precursor solution of barium ferrite is brought into contact with the silicon oxide substrate.
Figure 1B:
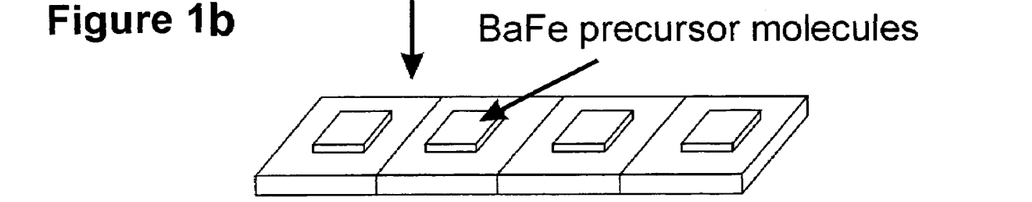
FIG. 1(b) demonstrates how the solution is transferred to the substrate as the tip is traversed across it.
Figure 1C:
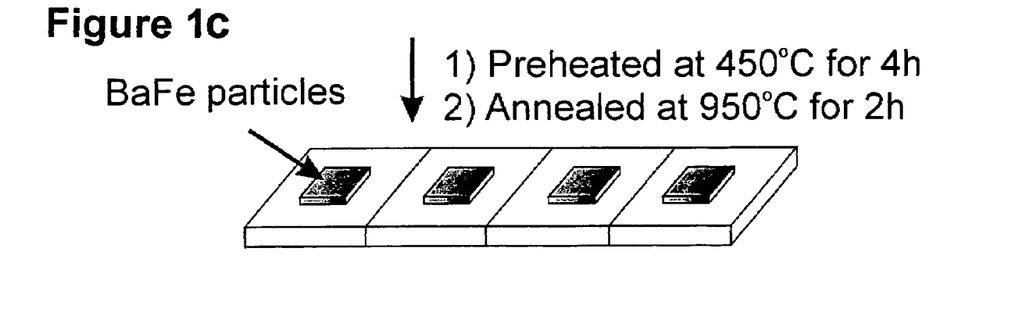
FIG. 1(c) illustrates how post-annealing yields the desired BaFe nanostructures.

BaFe nanostructures on a silicon oxide substrate were generated according to the following procedure. The surface of a SiO$_2$/Si wafer was first patterned via nanolithographic printing (contact force 2.5 nN; humidity 31%; temperature 24° C.) using an atomic force microscope (AFM) cantilever coated with a BaFe precursor solution that contains a mixture of iron nitrate (Fe(NO$_3$)$_3$.9H$_2$O) and barium carbonate (BaCO$_3$) in ethylene glycol (HOCH$_2$CH$_2$OH). The ethylene glycol dissolves and stabilizes the starting materials; it also wets the hydroxylated substrate, a factor that is important in the nanopatterning process. Indeed, ethylene glycol surprisingly provided better results not readily obtainable by 2-propanol, water, methanol, or ethanol as the solvents under nearly identical conditions. For example, some selection of solvents resulted in quick evaporation and immediate drying of the ink, and other selection of solvents resulted in excessive stickiness making patterning difficult. The patterns were preheated at 450° C. for 4 h and then annealed at 950° C. in an air atmosphere for 2 h, ultimately yielding BaFe nanostructures (FIG. 1).

Figure 2A:
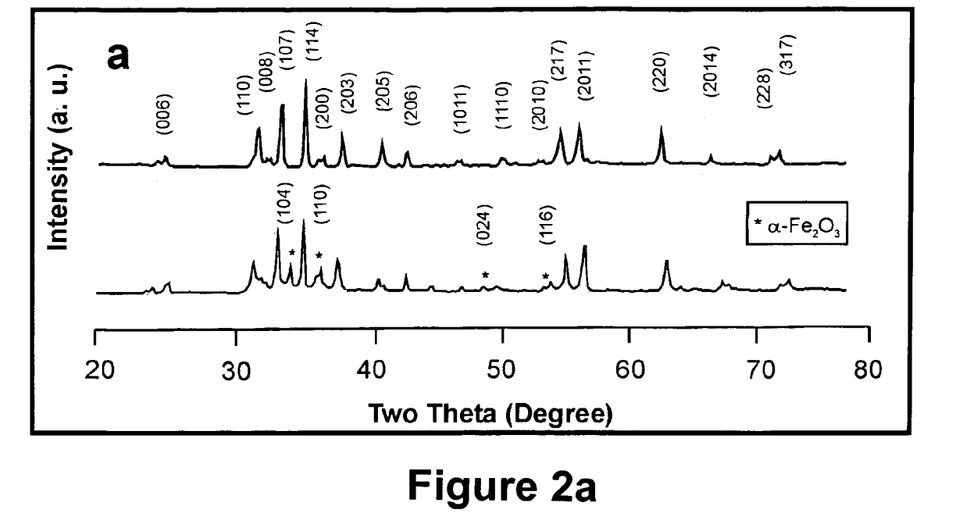
FIG. 2(a) is XRD pattern of as-synthesized BaFe particles. The indexing is based on tabulated hexagonal BaFe$_{12}$O$_{19}$ reflections.
Figure 2B:
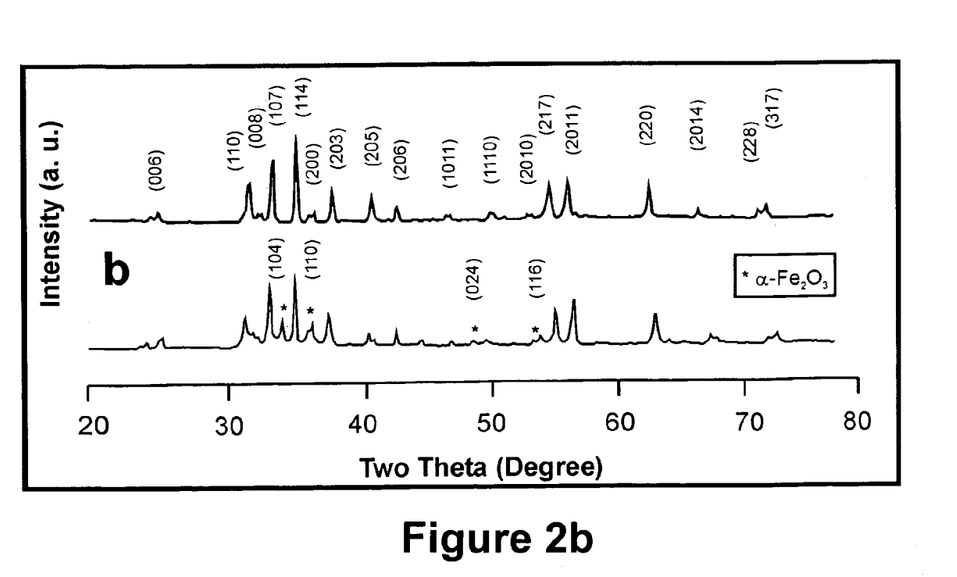
FIG. 2(b) is XRD spectrum of BaFe particles synthesized without the preheating step.
Figure 2C:
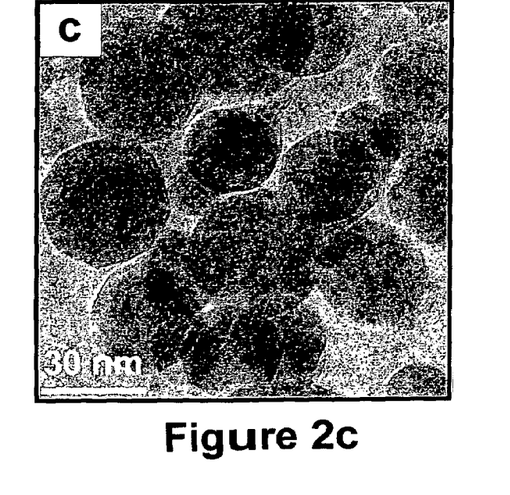
FIG. 2(c) is transmission electron microscope (TEM) image of as-synthesized BaFe particles.
Figure 2D:
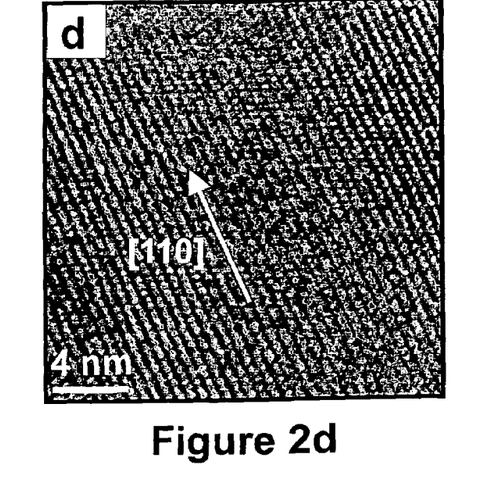
FIG. 2(d) is high resolution TEM image showing single crystal nature of these particles.
Figure 2E:
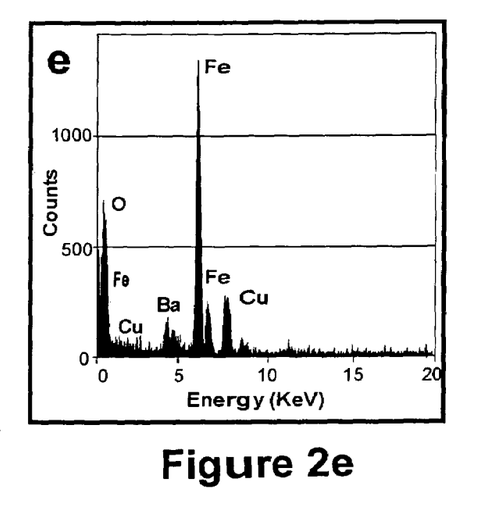
FIG. 2(e) is energy-dispersive x-ray spectroscopy (EDXS) spectrum obtained from these nanoparticles. The signal for Cu comes from the copper grid on which these particles were supported.
Figure 2F:
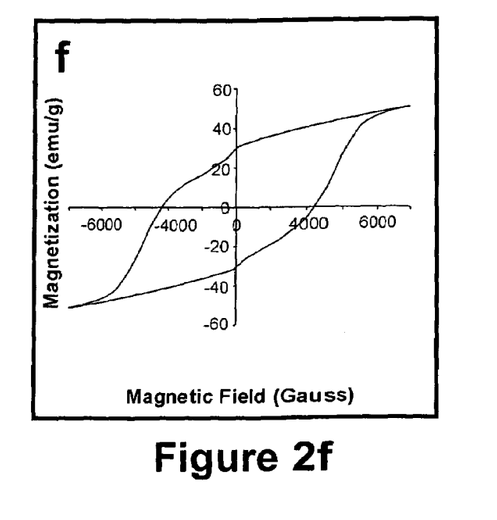
FIG. 2(f) presents magnetic hysteresis measurements of the particles at room temperature.

In order to compare the chemical and structural properties of the nanostructures with BaFe, bulk samples of BaFe particles and films were prepared by the aforementioned sol-gel method. The x-ray diffraction (XRD) pattern of the as-synthesized BaFe particles showed a series of Bragg reflections that can be well indexed as M-type hexagonal BaFe (FIG. 2a). In contrast, the XRD pattern of the sample without preheating showed peaks corresponding to the α-Fe$_2$O$_3$ phase (FIG. 2b). The size, morphology, and crystal structure of the BaFe particles were also investigated with a HF-2000 field emission gun (FEG) transmission electron microscope (TEM). The polygonal particles have a mean diameter of ~35 nm (FIG. 2c). High resolution TEM showed the lattice image of a BaFe particle viewed along the [110]$_c$ projection (FIG. 2d). Elemental analysis, using energy-dispersive x-ray spectroscopy (EDS) operating in the STEM mode, confirmed the presence of Ba, Fe, and O in individual nanoparticles as well as aggregate structures (FIG. 2e). The magnetic properties of the BaFe nanoparticles were investigated at room temperature by superconducting quantum interference device magnetometry (SQUID). The magnetic nanoparticles exhibit a "squarish" hysteresis loop with a high coercivity (4250 Gauss) and a large remnant magnetization (32.2 emu/g), which is consistent with earlier reports on BaFe particles (FIG. 2f) (see documents 15 and 16).

In a typical nanopatterning experiment, the BaFe precursor solution in ethylene glycol was prepared (see Methods section) and sonicated for 15 min before being used. A silicon nitride AFM micro cantilever was then dipped into the solution for 1 min. The cantilever was blown dry with compressed difluoroethane to obtain proper laser reflecting alignment. The barium ferrite precursor solution was deposited on a SiO$_2$/Si substrate by bringing the coated AFM tip in contact with the surface and then moving it across the substrate, using nanolithography software (available, NanoInk, Inc.,™ Chicago, Ill.). The aforementioned post-treatment procedure was used to generate all patterns reported herein (FIG. 3). With this strategy, magnetic nanostructures with dimensions ranging from several hundred nanometers down to 90 nm were generated.

Figure 3A:
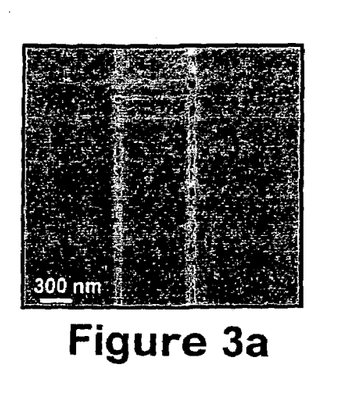
FIG. 3(a) is a topographic AFM image of magnetic BaFe lines on the silicon oxide substrate. The speed for the BaFe precursor deposition is 0.2 µm/s.
Figures 3B, 3D:
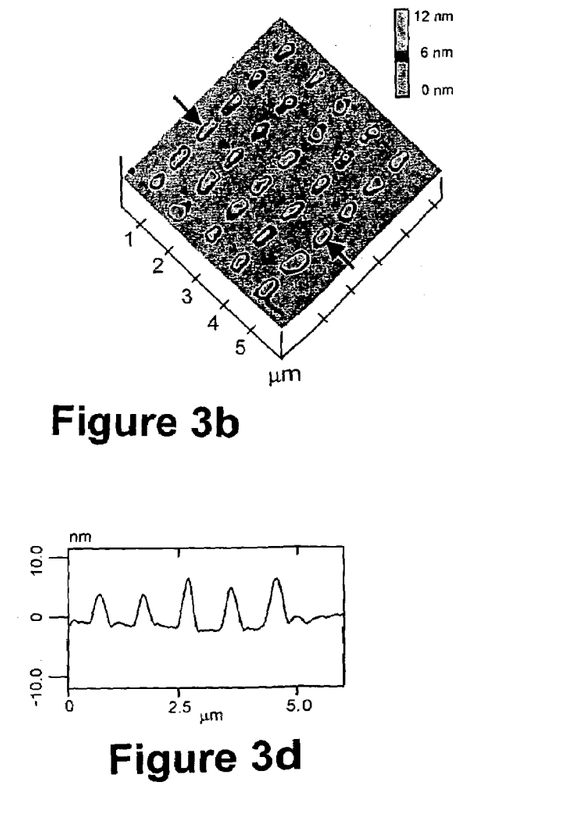
FIG. 3(b) is a topographic AFM image of an array of magnetic bars. The deposition speed is 0.1 µm/s.
FIG. 3(d) is a magnetic force microscope (MFM) image obtained from these magnetic bars.
Figure 3C:
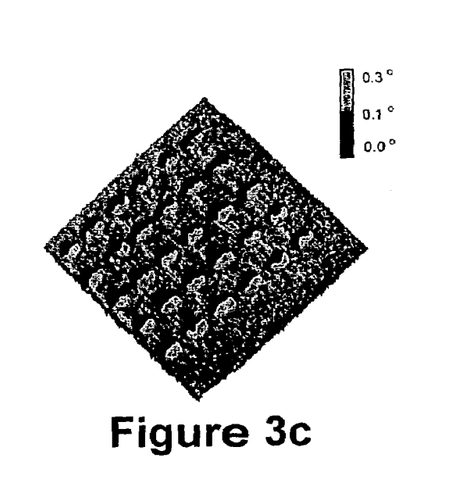
FIG. 3(c) is a cross-sectional topography trace of a line (marked by the arrows in FIG. 3(b).
Figure 3E:
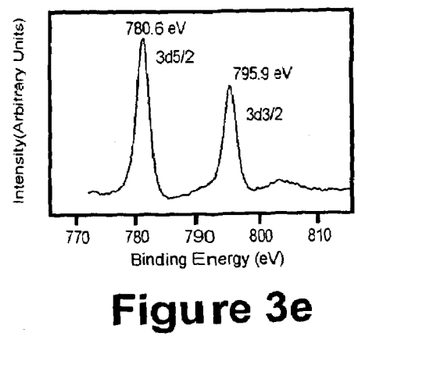
FIG. 3(e) shows barium peaks detected from the silicon oxide substrate using XPS.
Figure 3F:
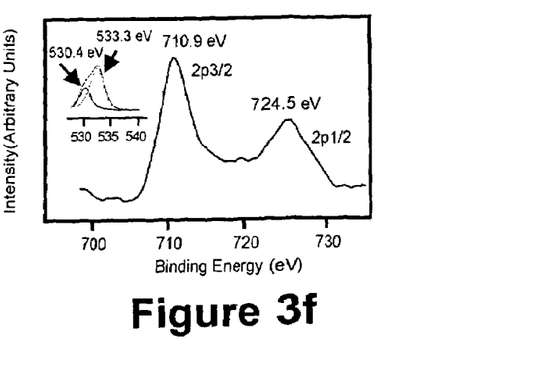
FIG. 3(f) shows iron peaks detected from the same sample (inset: oxygen peaks and the deconvolution result).

When a magnetic material is patterned into arrays in the form of nanosized dots, bars, or columns on a nonmagnetic matrix, each feature contains one or, at most, a few domains in contrast to the multidomain structure of conventional storage medium (for example, magnetic thin films) (see document 14). The patterned media in such structures remain stable down to much lower lateral dimensions than conventional bits in continuous media (see document 14). Lines of BaFe with an average width of 90 nm were generated via the combined DPN printing sol-gel approach (FIG. 3a). Arrays of magnetic BaFe bars that have an average area of 215×465 nm$^2$ with an average height of 6.7 nm were also generated by controlling the tip-substrate scan speed (FIGS. 3b, c). Preferably, the magnetic bars have an average height of about 5–25 nm. The magnetic properties of the nanopatterns were further examined by magnetic force microscopy (MFM) in lift mode. Before imaging, the tip, coated with a ferromagnetic thin film of cobalt, was magnetized with an external magnetic field. The magnetic force was then detected by measuring the phase shift in the cantilever oscillation, a consequence of the magnetic interactions acting on the tip. The MFM image indicates that these patterns were indeed magnetic (FIG. 3d). The elemental composition of the magnetic nanostructures on the substrate was determined by x-ray photoelectron spectroscopy (XPS). The Ba3d$_{5/2}$, and Ba3d$_{d3/2}$ peaks were observed at 780.6 eV and 795.9 eV, respectively, which were the characteristic values for BaFe$_{12}$O$_{19}$ (FIG. 3e). The Fe2p3/2 and Fe2p1/2 peaks were observed at 710.9 eV and 724.5 eV respectively, which were diagnostic of BaFe (FIG. 3f). The O1s spectrum showed a large FWHM of 2.5 eV, which was broadened on the low binding-energy side (FIG. 3f(inset)). The O1s spectrum could be resolved into two peaks using a least-square curve fitting method with a mixture of Gaussian and Lorentzian functions on a Shirley-type background (see document 26). The low binding-energy peak at 530.4 eV represents the O$^{2-}$ contribution in the BaFe$_{12}$O$_{19}$ while the peak at high binding-energy of 533.3 eV is attributed to the OH$^-$ on hydroxylated surface of silicon dioxide (see document 27).

Methods

Particle Synthesis and Substrate Preparation

Iron nitrate (4 g; 0.0115 mol) and barium carbonate (0.197 g; 0.001 mol) were dissolved in a solution of ethylene glycol (25 mL). Silicon oxide wafers were cleaved into two 0.5 in.×0.5 in. squares and sonicated in dichloromethane, methanol, and Nanopure water for 10 min, respectively. The wafers were then immersed in freshly mixed ammonium hydroxide/peroxide solution (NH$_4$OH:H$_2$O$_2$:H$_2$O, v:v:v=1:1:5) for 1 hour at about 100° C., after which time they were rinsed in Nanopure water. The wafers were dried in nitrogen gas before immersion in the different solvents.

Characterization of the BaFe

XRD spectra were recorded using a Ragiku X-ray diffractometer with Ni-filtered Cu Kα radiation operated at 45 kV and 20 mA. The diffraction angles were referenced to those for high-purity Si powder. The size and morphology of the particles were determined with a HF-2000 field TEM (Hitachi, Japan). The size distribution was determined by measuring the diameters of 400 particles. Magnetic measurements were performed with a superconducting quantum interference device (SQUID) magnetometer (Quantum Design, MPMS). XPS spectra were recorded using an Omicron ESCA probe operated in vacuum at around 4.8×10$^{-10}$ torr with monochromated Al Kα radiation (1486.6 eV, 300 W). Binding energies were corrected by referencing the C1S signal of adventitious hydrocarbon to 284.8 eV. The electron-pass energy in the analyzer was set at 50 eV.

AFM and MFM

Direct write nanolithographic printing experiments were carried out under ambient conditions (31% relative humidity and 24° C.) with a Thermomicroscopes CP AFM and commercial cantilevers (force constant=0.05 N/m, Si$_3$N$_4$). To minimize piezo tube drift problems, a 90-μm scanner with closed loop scan control was used for all of the DPN printing experiments. AFM and MFM measurements were made in air using a Digital Instruments Multimode Nanoscope IIIa with an extender electronics module in tapping and lift modes, respectively.

Figure 4:
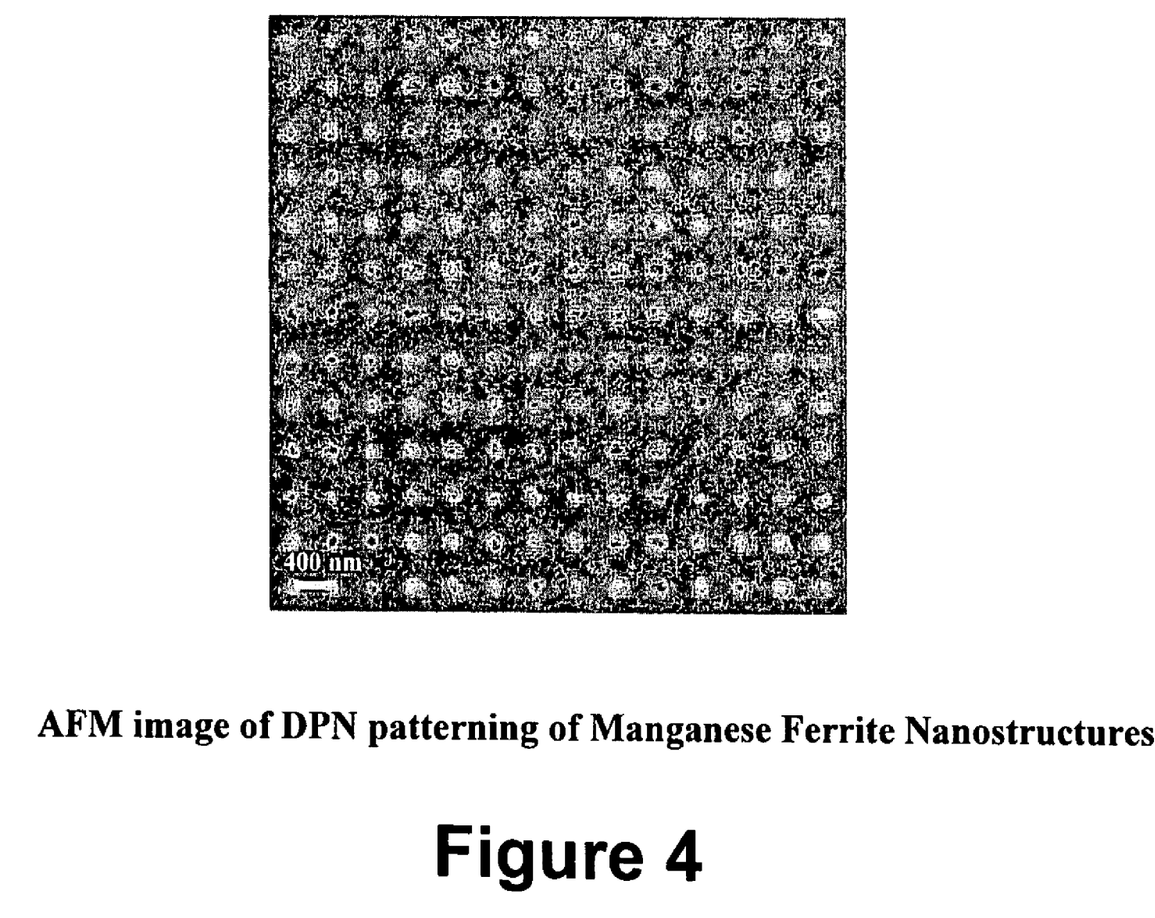
FIG. 4 provides an AFM image of DPN patterning of manganese ferrite (MnFe$_2$O$_4$) nanostructures. The distance between the centers of the nanostructures is about 400 nm. The dot size is about 150 nm.

Finally, FIG. 4 illustrates a working example for manganese ferrite arrays printed by DPN patterning, as imaged by AFM, using procedures described above for barium ferrite. In FIG. 4, the dot size was about 150 nm, and the distance between the center of the dots was about 400 nm. Ink formulation was the same as for the barium ferrite, however, manganese nitrate and ferric nitrate were used in ethylene glycol. The same results were found with manganese acetate used as the Mn source. Silicon and silica substrates provided excellent printing results.

In summary, the working examples have shown construction of barium ferrite and manganese ferrite nanostructures, based on a combination of a novel sol-gel process and the direct write nanolithographic printing method. The combined approach, which takes into account the versatility and attributes of direct write nanolithographic printing (direct-writing, feature shape and size control, and soft matter compatibility), provides for constructing sophisticated architectures of magnetic, ceramic, and conductive nanostructures that can provide further insight into magneto-electronic sensor devices and high density information storage systems. Indeed, based on the feature size attainable via this approach, performance can be found at a density of greater 60 Gb/in$^2$. Parallelization of nanolithographic printing can be used in achieving this density (see, for example, document 28).

The following documents, which are not admitted prior art, can further enable one to practice the present invention.

Documents:
1. Sorensen, C. M. *Nanoscale Materials in Chemistry* (Wiley, New York, 2001), including Chapter 6, "Magnetism" by C. M. Sorenson.
2. Awschalom, D. D. & Kikkawa, J. M. Electron spin and optical coherence in semiconductors. *Phys. Today* vol. 52, 33–38 (1999).
3. Sun, S., Murray, C. B., Weller, D., Folks, L. & Moser, A. Monodisperse FePt nanoparticles and ferromagnetic FePt nanocrystal superlattices. *Science* vol. 287, 1989–1991 (2000).
4. Roger, J., Pons, J. N., Massart, R., Halbreich, A. & Baori, J.-C. Some biomedical applications of ferrofluids. *Eur. Phys. .I: Appl. Phys.* Vol. 5, 321–325 (1999).
5. Chemla, Y. R. et al. Ultrasensitive magnetic biosensor for homogeneous immunoassay. *Proc Natl. Acad. Sci.* U.S.A. vol. 97, 14268–14272 (2000).
6. Prinz, G. A. Magnetoelectronics. *Science* vol. 282, 1660–1663 (1998).
7. H. Ohno et al. Electric-field control of ferromagnetism. *Nature* vol. 408, 944–946 (2000).
8. Baselt, D. R. et al. A biosensor based on magnetoresistance technology. *Biosens Bioelectron.* Vol. 13, 731–739 (1998).
9. Xia, Y., Rogers, J. A., Paul, K. & Whitesides, G. M Unconventional methods for fabricating and patterning nanostructures. *Chem. Rev.* vol. 99, 1823–1848 (1999).
10. Freeman, M. R. & Choi, B. C. Advances in magnetic microscopy. *Science* vol. 16, 1484–1488 (2001).
11. New, R. M. H., Pease, R. F. W. & White, R. L. Submicron patterning of thin cobalt films for magnetic storage. *J. Vac. Sci. Technol. B* vol. 12, 3196–3201 (1994).
12. Chou, S. Y., Krauss, P. R. & Kong, L. Nanolithographyically defined magnetic structures and quantum magnetic disk. *J. Appl. Phys.* Vol. 79, 6101–6106 (1996).
13. O'Grady, K. & Laidler, H. The limits to magnetic recording-media considerations. *J. Magn. Magn. Mater.* Vol. 200, 616–633 (1999).
14. White, R. L., New, R. M. H. & Pease, R. F. W. Patterned media: a viable route to 50 Gbit/in$^2$ and up for magnetic recording. *IEEE Trans. Mag.* Vol. 33, 990–995 (1997).
15. Hylton, T. L., Parker, M. A. & Howard, I. K. Preparation and magnetic properties of epitaxial barium ferrite thin films on sapphire with in-plane, uniaxial anisotropy. *Appl. Phys. Lett.* Vol. 61, 867–869 (1992).

16. Ishikawa, A., Tanahashi, K. & Futamoto, M" Magnetic and structural properties of Ba-ferrite films prepared by sol-gel processing. *J. Appl. Phys.* Vol. 79, 7080–7083 (1996).

17. Piner, R. D., Zhu, I. Xu, F., Hong, S. & Mirkin, C. A. Dip-pen nanolithography. *Science* vol. 283, 661–663 (1999).

18. Demers, L. M. et at. Direct patterning of modified oligonucleotides on metals and insulators by dip-pen nanolithography. *Science* vol. 296, 1836–1838 (2002).

19. Maynor, B. W., Li, Y. & Liu, J. Au "ink" for AFM "dip-pen" nanolithography. *Langmuir* vol. 17, 2575–2578 (2001).

20. Li, Y., Maynor, B. W. & Liu, J. Electrochemical AFM "dip-pen" nanolithography. *J. Am. Chem. Soc.* Vol. 123, 2105–2106 (2001).

21. Noy, A. et at. Fabrication of luminescent nanostructures and polymer nanowires using dip-pen nanolithography. *Nano Lett.* Vol. 2, 109–112 (2002).

22. Liu, X., Fu, L., Hong, S., Dravid, V. P. & Mirkin, C. A. Arrays of magnetic nanoparticles patterned via "dip-pen" nanolithography. *Adv. Mater.* Vol. 14, 231–234 (2002).

23. Su, M, Liu, X, Li, S.-Y, Dravid, V. P. & Mirkin, C. A. Moving beyond molecules: patterning solid state features via dip-pen nanolithography with sol-based inks. *J. Am. Chem. Soc.* Vol. 124, 1560–1561 (2002).

24. McKendry, R. et al. Creating nanoscale patterns of dendrimers on silicon surfaces with dip-pen nanolithography. *Nano Lett.* Vol. 2, 713–716 (2002).

25. Zhong, W. et al. Key step in synthesis of ultrafine $BaFe_{12}O_{19}$ by sol-gel technique. *J. Magn. Magn. Mater.* Vol. 168, 196–202 (1997).

26. Briggs, D. & Seah, M. P. *Practical Surface Analysis* (Wiley, Chichester, 1990).

27. Duval, Y., Mielczarski, J. A., Pokrovsky, O. S., Mielczarski, E. & Ehrhardt, J. J. Evidence of the existence of three types of species at the quantz-aqueous solution interface at pH 0–10: XPS surface group quantification and surface complexation modeling. *J. Phys. Chem. B* Vol. 106, 2937–2945 (2002).

28. Zhang, M. et al. A MEMS nanoplotter with high-density parallel dip-pen nanolithography (DPN) probe arrays. *Nanotech.* Vol. 13, 212–217 (2002).

29. U.S. Provisional application 60/115,133 filed Jan. 7, 1999.

30. U.S. Provisional application 60/157,633 filed Oct. 4, 1999.

31. U.S. Regular patent application Ser. No. 09/477,997 filed Jan. 5, 2000.

32. U.S. Provisional application 60/207,713 filed May 26, 2000.

33. U.S. Provisional application 60/207,711 filed May 26, 2000.

34. U.S. Provisional application 60/341,614 filed Dec. 17, 2001.

35. U.S. Provisional application 60/379,755 filed Aug. 9, 2002, "Apparatus, Materials, and Methods for Fabrication and Catalysis"

36. U.S. Regular application Ser. No. 09/866,533 filed May 24, 2001.

37. U.S. patent publication number 2002/0063212 A1 published May 30, 2002.

38. PCT publication number WO 00/41213 A1 published Jul. 13, 2000 based on PCT application no. PCT/US00/00319 filed Jan. 7, 2000.

39. PCT publication number WO 01/91855 A1 published Dec. 6, 2001 based on PCT application no. PCT/US01/17067 filed May 25, 2001.

40. U.S. Provisional application 60/326,767 filed Oct. 2, 2001, "Protein Arrays with Nanoscopic Features Generated by Dip-Pen Nanolithography"

41. U.S. Provisional application 60/337,598 filed Nov. 30, 2001, "Patterning of Nucleic Acids by Dip-Pen Nanolithography"

42. U.S. Provisional application 60/341,614 filed Dec. 17, 2001, "Patterning of Solid State Features by Dip-Pen Nanolithography"

43. U.S. Provisional application 60/367,514 filed Mar. 27, 2002, "Method and Apparatus for Aligning Patterns on a Substrate"

44. U.S. Provisional application 60/379,755 filed May 14, 2002, "Nanolithographic Methods Calibration Methods"

45. U.S. Provisional application 60/379,755 filed Aug. 9, 2002, "Apparatus, Materials, and Methods for Fabrication and Catalysis"

46. Demers et al. *Angew Chem. Int. Ed. Engl.* 2001, 40(16), 3069–3071.

47. Demers et al. *Angew Chem. Int. Ed. Engl.* 2001, 40(16), 3071–3073.

48. Liu et al. *Adv. Mater.* 2002, 14, No. 3, Feb. 5, 231–234.

49. L. M. Demers et al., "Direct Patterning of Modified Oligonucleotides on Metals and Insulators by Dip-Pen Nanolithography," *Science*, 2002, June 7, 296, pages 1836–1838.

50. Hong et al., *Science*, 15 Oct. 1999, Vol. 286, pgs. 523–525.

51. Hong et al., *Science*, 9 Jun. 2000, Vol. 288, pgs. 1808–1811.

52. Hong et al., *Langmuir*, 13 Oct. 1999, Vol. 15, pgs. 7897–1900.

53. Ivanisevic et al., *J. Am. Chem. Soc.*, 19 Jul. 2001, Vol. 123, pgs. 7887–7889.

54. Demers et al., *Angew Chem. Int. Ed. Engl.* 2001, 40(16), pgs. 3069–3071.

55. Demers et al., *Angew Chem. Int. Ed. Engl.* 2001, 40(16), pgs. 3071–3073.

56. Yang et al., *Nature*, 12 Nov. 1998, Vol. 396, pgs. 152–155.

57. Vioux, *Chem. Mater.*, 15 Sep. 1997, 9(11), pgs. 2292–2299.

58. Antonelli et al., *Angew Chem. Int. Ed. Engl.* 1995, 34(18), pgs. 2014–2017.

59. Ichinose et al., *Chem. Mater.*, 1997, 9(6), pgs. 1296–1298.

60. Kong et al., *Nature*, 29 Oct. 1998, Vol. 395, pgs. 878–881.

61. Yang et al., *Science*, 21 Jan. 2000, Vol. 287, pgs. 465–467.

62. Lu et al., *Nature*, 19 Apr. 2001, Vol. 410, pgs. 913–917.

63. Fan et al., *Nature*, 4 May 2000, Vol. 405, pgs. 56–60.

64. Yang et al., *Science*, 18 Dec. 1998, Vol. 282, pgs. 2244–2246.

All of the documents above, 1–64, are incorporated by reference in their entirety. Multiple embodiments are disclosed in this provisional application for fabricating magnetic patterns with use of dip pen nanolithographic printing as a patterning tool. For all embodiments in this disclosure, documents 17–24, 28–55 and 63 above, which relate to dip pen nanolithographic printing methods, are hereby incorporated by reference in their entirety and form part of the present disclosure. Further, documents 1–10, which relate to magnetic nanoscale materials exhibiting novel size-dependent properties are also hereby incorporated by reference in their entirety. In addition, documents 11–14, which relate that magnetic nanoscale materials are being explored as potential avenues to high-density recording media, are also hereby incorporated by reference in their entirety. Documents 15 and 16 relate that barium hexa-ferrite (BaFe), in particular, is a good hard magnet candidate for such media and are hereby incorporated by reference in their entirety. Documents 25, 56–59 and 64 relate to sol-gel processes for forming metal oxides and are hereby incorporated by reference in their entirety. Documents 26 and 27 relate to x-ray photoelectron spectroscopy analysis; document 60 relates to making carbon nanotubes; document 61 relates to making mesostructural waveguides; and document 62 relates to making nanocomposites; all of which are hereby incorporated by reference in their entirety.

What is claimed is:

1. A method of forming a magnetic nanostructure comprising:
   depositing a magnetic nanostructure precursor on a substrate from a nanoscopic tip; and
   converting the precursor to form the magnetic nanostructure on the substrate.

2. The method according to claim 1, wherein the magnetic nanostructure precursor is a ferromagnetic nanostructure precursor.

3. The method according to claim 1, wherein the magnetic nanostructure precursor is a hard magnetic nanostructure precursor.

4. The method according to claim 1, wherein the magnetic nanostructure precursor is a semi-hard magnetic nanostructure precursor.

5. The method according to claim 1, wherein the magnetic nanostructure precursor is a soft magnetic nanostructure precursor.

6. The method according to claim 1, wherein the depositing step is carried out with use of a solid tip having the magnetic nanostructure precursor at the end of the tip.

7. The method according to claim 1, wherein the depositing step is carried out with use of a scanning probe microscope tip.

8. The method according to claim 1, wherein the depositing step is carried out with use of a hollow tip.

9. The method according to claim 1, wherein the depositing step is carried out with use of a sol-gel precursor.

10. The method according to claim 1, wherein the nanostructure has a size dimension other than height of about one micron or less.

11. The method according to claim 1, wherein the nanostructure has a size dimension other than height of about 100 nm or less, and wherein the conversion step comprises heating.

12. The method according to claim 1, wherein the depositing step is carried out with use of a solid tip having the hard magnet nanostructure precursor at the end of the tip and with use of a sol-gel precursor, and wherein the conversion step comprises heating.

13. The method according to claim 1, wherein the depositing step is carried out with use of an atomic force microscope tip, wherein the depositing step is carried out with use of a sol-gel precursor, wherein the conversion step comprises heating, and wherein the nanostructure has a size dimension other than height of about 100 nm or less.

14. A method of forming a hard magnet nanostructure comprising:
   depositing a hard magnet nanostructure precursor on a substrate from a tip; and
   converting the precursor to form the hard magnet nanostructure on the substrate.

15. The method according to claim 14, wherein the depositing step is carried out with use of a solid tip having the hard magnet nanostructure precursor at the end of the tip.

16. The method according to claim 14, wherein the depositing step is carried out with use of a scanning probe microscope tip.

17. The method according to claim 14, wherein the depositing step is carried out with use of a hollow tip.

18. The method according to claim 14, wherein the depositing step is carried out with use of a sol-gel precursor.

19. The method according to claim 14, wherein the nanostructure has a size dimension other than height of about one micron or less.

20. The method according to claim 14, wherein the nanostructure has a size dimension other than height of about 100 nm or less.

21. The method according to claim 14, wherein the conversion step comprises heating.

22. The method according to claim 14, wherein the depositing step is carried out with use of a solid tip having the hard magnet nanostructure precursor at the end of the tip, wherein the depositing step is carried out with use of a sol-gel precursor, and wherein the conversion step comprises heating.

23. The method according to claim 14, wherein the depositing step is carried out with use of an atomic force microscope tip, wherein the depositing step is carried out with use of a sol-gel precursor, wherein the conversion step comprises heating, and wherein the nanostructure has a size dimension other than height of about 100 nm or less.

24. A method of forming a soft magnet nanostructure comprising:
   depositing a soft magnet nanostructure precursor on a substrate from a tip; and
   converting the precursor to form the soft magnet nanostructure on the substrate.

25. The method according to claim 24, wherein the depositing step is carried out with use of a solid tip having the soft magnet nanostructure precursor at the end of the tip.

26. The method according to claim 24, wherein the depositing step is carried out with use of a scanning probe microscope tip.

27. The method according to claim 24, wherein the depositing step is carried out with use of a sol-gel precursor.

28. The method according to claim 24, wherein the nanostructure has a size dimension other than height of about 100 nm or less, and wherein the conversion step comprises heating.

29. The method according to claim 24, wherein the depositing step is carried out with use of a solid tip having soft magnetic ferrite nanostructure precursor at the end of the tip, wherein the depositing step is carried out with use of a sol-gel precursor, and wherein the conversion step comprises heating.

30. The method according to claim 24, wherein the depositing step is carried out with use of an atomic force microscope tip, wherein the depositing step is carried out with use of a sol-gel precursor, wherein the conversion step comprises heating, and wherein the nanostructure has a size dimension other than height of about 100 nm or less.

31. A method of forming a sol gel magnetic nanostructure comprising:
   depositing a sol gel magnetic nanostructure precursor on a substrate from a tip; and converting the precursor to form the sol-gel magnetic nanostructure on the substrate.

32. The method according to claim 31, wherein the depositing step is carried out with use of a solid tip having the hard magnetic nanostructure precursor at the end of the tip.

33. The method according to claim 31, wherein the depositing step is carried out with use of a solid tip having the soft magnetic nanostructure precursor at the end of the tip.

34. The method according to claim 31, wherein the depositing step is carried out with use of a scanning probe microscope tip.

35. The method according to claim 31, wherein the nanostructure has a size dimension other than height of about one micron or less.

36. The method according to claim 31, wherein the nanostructure has a size dimension other than height of about 100 nm or less.

37. The method according to claim 31, wherein the conversion step comprises heating.

38. The method according to claim 31, wherein the depositing step is carried out with use of a solid tip having the hard magnet nanostructure precursor at the end of the tip, wherein the nanostructure has a size dimension other than height of about 1,000 nm or less, and wherein the conversion step comprises heating.

39. The method according to claim 31, wherein the depositing step is carried out with use of an atomic force microscope tip, wherein the conversion step comprises heating, and wherein the nanostructure has a size dimension other than height of about 100 nm or less.

40. A method of forming an array of magnetic nanostructures comprising:
depositing one or more magnetic nanostructure sol-gel precursor on a substrate to form a plurality of nanostructures of precursors; and
converting the nanostructures to form the array of magnetic nanostructures.

41. The method according to claim 40, wherein the depositing step is carried out with use of a solid tip having the magnetic nanostructure sol gel precursor at the end of the tip.

42. The method according to claim 40, wherein the depositing step is carried out with use of an atomic force microscope tip.

43. The method according to claim 40, wherein the depositing step is carried out with use of a plurality of tips.

44. The method according to claim 40, wherein the nanostructure has a size dimension other than height of about one micron or less.

45. The method according to claim 40, wherein the nanostructure has a size dimension other than height of about 100 nm or less.

46. The method according to claim 40, wherein the conversion step comprises heating.

47. The method according to claim 40, wherein the depositing step is carried out with use of a solid tip having the hard magnet nanostructure precursor at the end of the tip, wherein the depositing step is carried out with use of a sol-gel precursor consisting essentially of metallic precursors, and wherein the conversion step comprises heating.

48. The method according to claim 40, wherein the depositing step is carried out with use of an atomic force microscope tip, wherein the conversion step comprises heating, and wherein the nanostructure has a size dimension other than height of about 100 nm or less.

49. A method of forming a ferromagnetic nanostructure comprising:
depositing a ferromagnetic nanostructure precursor on a substrate; and
converting the precursor to form the ferromagnetic nanostructure on the substrate, wherein the precursor comprises a solvent based patterning ink consisting essentially of magnetic precursor and solvent in sol state.

50. The method according to claim 49, wherein the depositing step is carried out with use of a solid tip having the nanostructure precursor at the end of the tip.

51. The method according to claim 49, wherein the depositing step is carried out with use of an atomic force microscope tip.

52. The method according to claim 49, wherein the depositing step is carried out with use of a sol-gel precursor.

53. The method according to claim 49, wherein the nanostructure has a size dimension other than height of about 100 nm or less.

54. The method according to claim 49, wherein the conversion step comprises heating, including a preheating step and an annealing step, and the ferromagnetic nanostructure comprises barium ferrite.

55. The method according to claim 49, wherein the depositing step is carried out with use of a solid tip having the nanostructure precursor at the end of the tip, wherein the depositing step is carried out with use of a sol-gel precursor, wherein the ferromagnet is a hard ferromagnet, and wherein the conversion step comprises heating.

56. The method according to claim 49, wherein the depositing step is carried out with use of an atomic force microscope tip, wherein the depositing step is carried out with use of a sol-gel precursor, wherein the conversion step comprises heating, and wherein the nanostructure has a size dimension other than height of about one micron or less.

57. A method of nanolithography comprising:
providing a substrate,
providing a nanoscopic tip having an inking composition thereon, wherein the inking composition comprises at least one magnetic material precursor;
transferring the inking composition from the nanoscopic tip to the substrate to form a deposit on the substrate comprising at least one magnetic material precursor.

58. The method according to claim 57, wherein the converting step comprises heating the precursor to form the magnetic material.

59. The method according to claim 57, wherein the nanoscopic tip is a scanning probe microscopic tip.

60. The method according to claim 57, wherein the nanoscopic tip is an atomic force microscopic tip.

61. The method according to claim 57, wherein the inking composition is a sol-gel precursor.

62. The method according to claim 57, wherein the deposit has as least one lateral dimension which is about 1,000 nm or less.

63. The method according to claim 57, wherein the magnetic material is a hard magnetic material.

64. The method according to claim 57, wherein the magnetic material is a soft magnetic material.

65. A method of nanolithography comprising:
positioning a scanning probe microscopic tip having a magnetic reactive ink composition thereon relative to a substrate so that the reactive ink composition is transferred from the nanoscopic tip to the substrate to form a deposit on the substrate, wherein the reactive ink is a sol-gel precursor capable of undergoing a sol-gel reaction.

66. The method according to claim 65, further comprising the step of heating the deposit to substantially complete the sol gel reaction.

67. The method according to claim 65, wherein the tip is an atomic force microscopic tip.

68. The method according to claim 65, wherein the deposit is a hard magnetic deposit.

69. The method according to claim 65, wherein the deposit is a soft magnetic deposit.

70. A method of nanolithography comprising patterning a nanoscopic deposit comprising a magnetic solid state material precursor on a substrate, and converting the solid state material precursor to the magnetic solid state material.

71. The method according to claim 70, wherein the patterning is carried out with use of a nanoscopic tip.

72. The method according to claim 70, wherein the tip is an atomic force microscopic tip.

73. The method according to claim 70, wherein the precursor is a sol gel precursor.

74. The method according to claim 70, wherein the magnetic solid state material is a hard magnetic solid state material.

75. The method according to claim 70, wherein the magnetic solid state material is a soft magnetic solid state material.

* * * * *